United States Patent
Nobori

(10) Patent No.: US 10,298,920 B2
(45) Date of Patent: May 21, 2019

(54) PROJECTOR AND METHOD OF CONTROLLING A PROJECTOR

(71) Applicant: SEIKO EPSON CORPORATION, Tokyo (JP)

(72) Inventor: Tatsuhiko Nobori, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 738 days.

(21) Appl. No.: 14/572,326

(22) Filed: Dec. 16, 2014

(65) Prior Publication Data

US 2015/0172645 A1    Jun. 18, 2015

(30) Foreign Application Priority Data

Dec. 18, 2013  (JP) ................. 2013-261162

(51) Int. Cl.
*H04N 9/31* (2006.01)
*H04N 13/356* (2018.01)

(52) U.S. Cl.
CPC ......... *H04N 13/356* (2018.05); *H04N 9/3155* (2013.01)

(58) Field of Classification Search
CPC ........... H04N 13/0452; H04N 13/0459; H04N 5/7416
USPC ....................... 353/85, 7; 348/759
See application file for complete search history.

(56) References Cited

U.S. PATENT DOCUMENTS

| | | | |
|---|---|---|---|
| 2007/0018951 A1 | 1/2007 | Nobori et al. | |
| 2007/0165304 A1 | 7/2007 | Tomita | |
| 2008/0013001 A1 | 1/2008 | Jang et al. | |
| 2011/0012915 A1 | 1/2011 | Nobori et al. | |
| 2011/0096105 A1* | 4/2011 | Park ......................... | G09G 3/36 345/690 |
| 2011/0228056 A1* | 9/2011 | Okumoto ........... | H04N 13/0438 348/51 |
| 2012/0019524 A1 | 1/2012 | Nobori | |
| 2012/0019568 A1 | 1/2012 | Nobori | |
| 2012/0038690 A1* | 2/2012 | Lee .................... | G02B 27/2264 345/691 |
| 2012/0140028 A1 | 6/2012 | Tomita | |
| 2013/0050291 A1 | 2/2013 | Nobori et al. | |

(Continued)

FOREIGN PATENT DOCUMENTS

| | | |
|---|---|---|
| JP | 2005175538 A | 6/2005 |
| JP | 2007041535 A | 2/2007 |

(Continued)

*Primary Examiner* — Steven Whitesell Gordon
*Assistant Examiner* — Jerry L Brooks
(74) *Attorney, Agent, or Firm* — Oliff PLC

(57) ABSTRACT

A projector that projects an image based on image data, includes alight source, a modulation unit that modulates light which is emitted from the light source, a light attenuation rate setting unit that sets a light attenuation rate based on the image data, and a light adjustment unit that adjusts intensity of incident light of the modulation unit, according to the light attenuation rate which is set by the light attenuation rate setting unit. The light attenuation rate setting unit sets a minimum value of an adjustment range of the light adjustment unit in a case where the image data is stereoscopic image data to a higher value than a minimum value of an adjustment range of the light adjustment unit in a case where the image data is not stereoscopic image data.

8 Claims, 7 Drawing Sheets

(56) References Cited

U.S. PATENT DOCUMENTS

| | | | |
|---|---|---|---|
| 2013/0076807 A1* | 3/2013 | Inoue | G09G 3/003 345/690 |
| 2013/0247977 A1 | 9/2013 | Kumai et al. | |
| 2013/0300841 A1 | 11/2013 | Tomita | |
| 2015/0294615 A1* | 10/2015 | Zhang | H05B 33/0818 345/212 |

FOREIGN PATENT DOCUMENTS

| | | |
|---|---|---|
| JP | 2007065067 A | 3/2007 |
| JP | 2008505372 A | 2/2008 |
| JP | 4432933 B2 | 3/2010 |
| JP | 2010204520 A | 9/2010 |
| JP | 2012028963 A | 2/2012 |
| JP | 2012028964 A | 2/2012 |
| JP | 2012028965 A | 2/2012 |
| JP | 2012103357 A | 5/2012 |
| JP | 2012151641 A | 8/2012 |
| JP | 2013050523 A | 3/2013 |
| JP | 2013073076 A | 4/2013 |
| JP | 2013191947 A | 9/2013 |
| JP | 2014048527 A | 3/2014 |

\* cited by examiner

PROJECTOR AND METHOD OF CONTROLLING A PROJECTOR

The entire disclosure of Japanese Patent Application No. 2013-261162, filed Dec. 18, 2013, is expressly incorporated by reference herein.

BACKGROUND

1. Technical Field

The present invention relates to a projector and a method of controlling the projector.

2. Related Art

In a projector of the related art, it is known that dimming is performed according to an image to be displayed (for example, refer to Japanese Patent No. 4432933). The projector described in Japanese Patent No. 4432933 performs processing of expanding a luminance range of an image and dimming, and thereby it is possible to increase a sense of contrast of an image, and to suppress overexposure of the image.

In addition, it is known that light is modulated by a liquid crystal display panel or the like in a projector (for example, refer to JP-A-2012-103357).

In general, a liquid crystal display panel has a response speed that decreases under a low temperature environment. For this reason, if a projector having a liquid crystal display panel is used under a low temperature environment, there is a possibility that the temperature of the liquid crystal display panel is lowered to the extent that the response speed is affected. A decrease of the response speed of the liquid crystal display panel causes an afterimage, and in addition to this, for example, when a stereoscopic image is displayed, crosstalk is easily generated. Thus, the decrease of the response speed of the liquid crystal display panel is not preferred. In addition, even when a device, other than the liquid crystal display panel, that modulates light is used, the response speed is decreased when the temperature is lower than an optimal operation temperature, and thereby there is a possibility that afterimage or crosstalk is easily generated.

SUMMARY

An advantage of some aspects of the invention is that a good response speed of a modulation unit in a projector which modulates light and projects an image is maintained.

An aspect of the invention is directed to a projector that projects an image based on image data, including: a light source; a modulation unit that modulates light which is emitted from the light source; a light attenuation rate setting unit that sets a light attenuation rate based on the image data; and a light adjustment unit that adjusts intensity of incident light of the modulation unit, according to the light attenuation rate which is set by the light attenuation rate setting unit, in which the light attenuation rate setting unit sets a minimum value of an adjustment range of the light adjustment unit in a case where the image data is stereoscopic image data to a higher value than a minimum value of an adjustment range of the light adjustment unit in a case where the image data is not stereoscopic image data.

According to the aspect of the invention, when the image based on the stereoscopic image data is displayed, intensity of the incident light of the modulation unit is secured, and thus, the modulation unit is heated by irradiation with light. For this reason, it is possible to appropriately maintain the temperature of the modulation unit, and to maintain a good response speed of the modulation unit.

In the projector according to the aspect of the invention, the light source may include a solid light source.

According to the aspect of the invention with this configuration, even when a solid light source with a small amount of heat generation is used, intensity of incident light which is incident on the modulation unit is secured, and thereby it is possible to maintain a good response speed.

In the projector according to the aspect of the invention, the light adjustment unit may adjust light intensity that is emitted from the light source, according to the light attenuation rate that is set by the light attenuation rate setting unit.

According to the aspect of the invention with this configuration, by setting a light attenuation rate of the light adjustment unit, the light intensity that is applied to the modulation unit from the light source is secured, and thereby it is possible to maintain a good response speed of the modulation unit.

In the projector according to the aspect of the invention, the light attenuation rate setting unit may set the light attenuation rate in such a manner that the light adjustment unit does not adjust the intensity of the incident light to zero in a case where the image data is stereoscopic image data.

According to the aspect of the invention with this configuration, it is possible to appropriately adjust an intensity of incident light of the modulation unit.

In the projector according to the aspect of the invention, a characteristic amount acquisition unit that acquires an amount of characteristic of the image data may be further included, in which the light attenuation rate setting unit may set the light attenuation rate of the light adjustment unit, based on the amount of characteristic that is acquired by the characteristic amount acquisition unit.

According to the aspect of the invention with this configuration, it is possible to adjust an intensity of incident light of the modulation unit in correspondence with the image data, and to appropriately maintain the temperature of the modulation unit.

The projector according to the aspect of the invention may further include a luminance expansion rate acquisition unit that acquires a expansion coefficient of luminance of an image, based on the amount of characteristic which is acquired by the characteristic amount acquisition unit, and a luminance expansion processing unit that expands luminance of an image which is displayed in the modulation unit, based on the expansion coefficient that is acquired by the luminance expansion rate acquisition unit, in which the light attenuation rate setting unit may set the light attenuation rate of the light adjustment unit, based on the expansion coefficient acquired by the luminance expansion rate acquisition unit.

According to the aspect of the invention with this configuration, based on an amount of characteristic of the image data, the processing for expanding the luminance of the image and the processing for adjusting an intensity of the incident light are performed, and thereby it is possible to increase a sense of contrast. Furthermore, it is possible to appropriately maintain the temperature of the modulation unit.

In the projector according to the aspect of the invention, in a case where the light attenuation rate of the light adjustment unit that is obtained based on the expansion coefficient is lower than a light attenuation rate that is set in advance, the light attenuation rate setting unit may change the light attenuation rate of the light adjustment unit to a value that is set in advance.

According to the aspect of the invention with this configuration, it is possible to appropriately maintain the temperature of the modulation unit by simple processing.

In the projector according to the aspect of the invention, a table that makes the amount of characteristic of the image data correspond to the light attenuation rate of the light adjustment unit, may be further included, in which the light attenuation rate setting unit may set the light attenuation rate based on the amount of characteristic that is acquired by the characteristic amount acquisition unit, by referring to the table, and in which the table being referred to may be switched, in a case where the image data is stereoscopic image data and in a case where the image data is not stereoscopic image data.

According to the aspect of the invention with this configuration, by switching the table, it is possible to maintain easily and appropriately the temperature of the modulation unit. In addition, it is possible to control precisely and rapidly the light attenuation rate using the table.

Another aspect of the invention is directed to a method of controlling a projector that projects an image based on image data, including: setting a light attenuation rate based on the image data; adjusting intensity of incident light of a modulation unit, according to the light attenuation rate which is set; and setting a minimum value of an adjustment range of incident light in a case where the image data is stereoscopic image data to a higher value than a minimum value of an adjustment range of the incident light in a case where the image data is not stereoscopic image data.

According to the aspect of the invention, when the image based on the stereoscopic image data is displayed, an intensity of the incident light of the modulation unit is secured, and thus, the modulation unit is heated by irradiation with light. For this reason, it is possible to appropriately maintain the temperature of the modulation unit, and to maintain a good response speed of the modulation unit.

According to the aspects of the invention, it is possible to appropriately maintain temperature of a modulation unit, and to maintain a good response speed of the modulation unit.

BRIEF DESCRIPTION OF THE DRAWINGS

The invention will be described with reference to the accompanying drawings, wherein like numbers reference like elements.

DESCRIPTION OF EXEMPLARY EMBODIMENTS

First Embodiment

Figure 1:
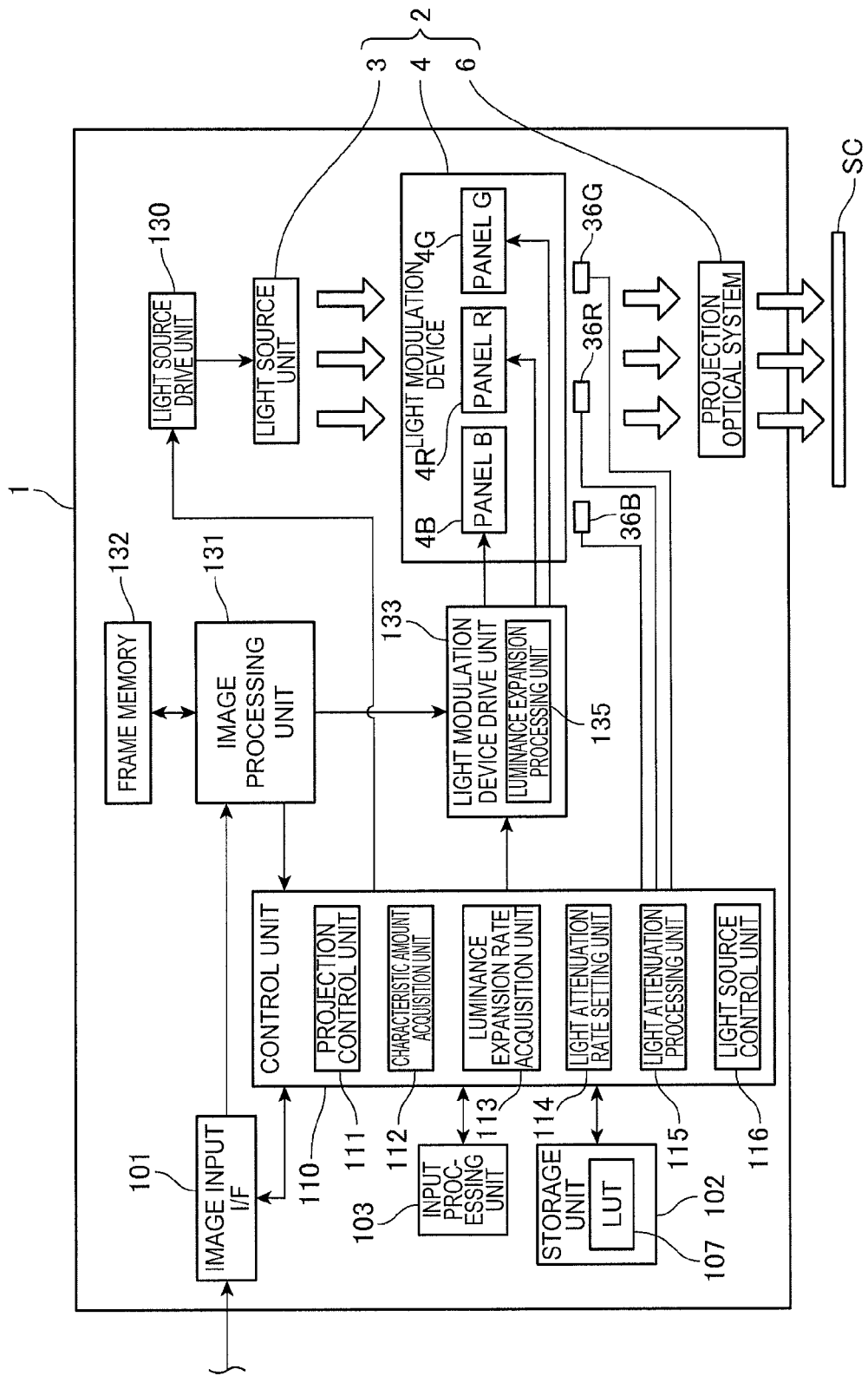
FIG. 1 is a functional block diagram of a projector according to a first embodiment.

Hereinafter, an embodiment of the invention will be described with reference to the drawing.

FIG. 1 is a block diagram illustrating a functional configuration of a projector 1 according to the embodiment. As a display device that projects an image on a screen SC (projection surface), the projector 1 is connected via an image input I/F (interface) 101 to an external image supply device (not illustrated), such as a computer of PC or the like, or various image players. The projector 1 projects the image on the screen SC, based on digital image data that is input to the image input I/F 101.

The projector 1 includes a projection unit 2 that forms an optical image. The projection unit 2 includes a light source unit 3 (light source), a light modulation device (modulation unit) 4, and a projection optical system 6. The light source unit 3 can use a lamp such as a xenon lamp or an ultra high pressure mercury lamp, or solid light source such as a light emitting diode (LED) or a laser light source. In the present embodiment, an example in which a laser light source is included will be described, as will be described later. The light source unit 3 includes a laser light source, and an optical component that generates light of three colors of red (R), green (G), and blue (B) based on the light which is emitted from the laser light source. The laser light source of the light source unit 3 is PWM-controlled by a pulse signal that is output from light source drive unit 130.

The light modulation device 4 modulates the light of three colors of R, G, and B that is emitted from the light source unit 3. The light modulation device 4 includes three liquid crystal light valves in correspondence with the light of three colors of R, G, and B. The liquid crystal light valves according to the present embodiment are configured with reflection type liquid crystal panels 4R, 4G, and 4B.

The projection optical system 6 includes a lens group that synthesizes and condenses the light which is modulated by the light modulation device 4, and projects color image light on the screen SC. The projection optical system 6 includes a focus adjustment mechanism or a zoom mechanism. Focus adjustment or zoom adjustment is performed by an operation of a user. In addition, the projector 1 may include a projection optical system drive unit configured with a motor or the like that drives the focus adjustment mechanism or the zoom mechanism.

Figure 2:
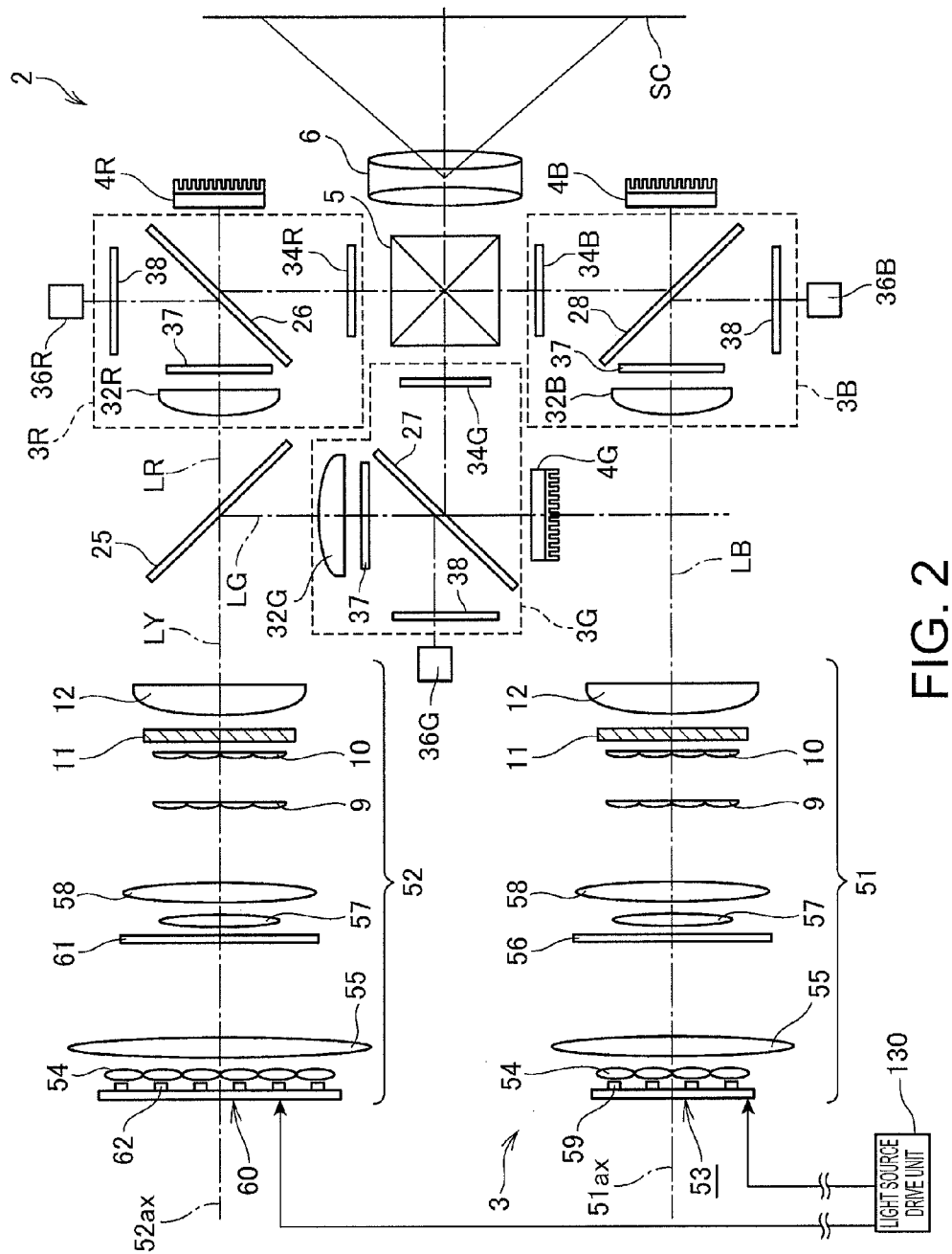
FIG. 2 is a diagram illustrating in detail a configuration of a projection unit.

FIG. 2 is a diagram illustrating in detail a configuration of the projection unit 2.

As illustrated in FIG. 2, the projector 1 includes a blue light illumination device 51, a yellow light illumination device 52, a dichroic mirror 25, and a light guiding optical system. These configure the light source unit 3 illustrated in FIG. 1. It can also be interpreted that the entire light source unit 3 corresponds to the light source unit according to the invention. In addition, it can be said that the blue light illumination device 51 and the yellow light illumination device 52 correspond to the light source unit. Alternatively, it can also be interpreted that a blue laser diode 59 which is included in a blue laser diode array 53, and an excitation laser diode 62 which is included in an excitation laser diode array 60 correspond to the light source unit according to the invention.

The light guiding optical system is configured with a light guiding optical system 3R, a light guiding optical system 3G, and a light guiding optical system 3B corresponding to three colors R, G, and B. The reflection type liquid crystal panels 4R, 4G, and 4B are provided at positions corresponding to the light guiding optical systems 3R, 3G, and 3B. The blue light illumination device 51 mainly emits blue light LB of P-polarized light as an example. The yellow light illumination device 52 mainly emits yellow light LY of P-polarized light as an example.

In addition, the projector 1 includes a cross dichroic prism 5, and the projection optical system 6 is disposed on a side where light is emitted from the cross dichroic prism 5. The cross dichroic prism 5 can also be regarded as a portion of the projection optical system 6.

Furthermore, optical sensors 36R, 36G, and 36B are provided at positions corresponding to the light guiding optical systems 3R, 3G, 3B.

As an example, the dichroic mirror 25 according to the present embodiment permits the red light LR having a longer wavelength than a predetermined reference wavelength, to pass through, in the yellow light LY which is emitted from the yellow light illumination device 52, and reflects the green light LG having a wavelength equal to or shorter than the predetermined reference wavelength.

The light guiding optical system 3R guides the red light of S-polarized light that is reflected by a polarization beam splitter 26, in the red light LR that passes through the dichroic mirror 25, to the optical sensor 36R. In addition, the light guiding optical system 3R guides the red light of the P-polarized light that passes through the polarization beam splitter 26, in the red light LR, to the reflection type liquid crystal panel 4R. In addition, the light guiding optical system 3R guides the red light of the S-polarized light that is reflected by the polarization beam splitter 26, in the red light LR that is reflected by the reflection type liquid crystal panel 4R, to the cross dichroic prism 5.

The light guiding optical system 3G guides the green light of the S-polarized light that is reflected by a polarization beam splitter 27, in the green light LG that is reflected by the dichroic mirror 25, to the optical sensor 36G. In addition, the light guiding optical system 3G guides the green light of the P-polarized light that passes through the polarization beam splitter 27, in the green light LG, to the reflection type liquid crystal panel 4G. In addition, the light guiding optical system 3G guides the green light of the S-polarized light that is reflected by the polarization beam splitter 27, in the green light LG that is reflected by the reflection type liquid crystal panel 4G, to the cross dichroic prism 5.

The light guiding optical system 3B guides the blue light of the S-polarized light reflected by a polarization beam splitter 28, in the blue light LB that is emitted from the blue light illumination device 51, to the optical sensor 36B. In addition, the light guiding optical system 3B guides the blue light of the P-polarized light that passes through the polarization beam splitter 28, in the blue light LB, to the reflection type liquid crystal panel 4B. In addition, the light guiding optical system 3B guides the blue light of the S-polarized light that is reflected by the polarization beam splitter 28, in the blue light LB that is reflected by the reflection type liquid crystal panel 4B, to the cross dichroic prism 5.

The reflection type liquid crystal panels 4R, 4G, and 4B modulate light of colors that is guided by the light guiding optical systems 3R, 3G, and 3B, according to an image signal that is input from a light modulation device drive unit 133 (FIG. 1) which will be described later. The cross dichroic prism 5 synthesizes the red light that is guided by the light guiding optical system 3R, the green light that is guided by the light guiding optical system 3G, and the blue light that is guided by the light guiding optical system 3B. The projection optical system 6 projects the light that is synthesized by the cross dichroic prism 5 onto the screen SC.

The optical sensor 36R detects the brightness (light intensity as an example in the present embodiment) of the red light of the S-polarized light that is guided by the light guiding optical system 3R, and outputs a red light intensity signal that indicates light intensity of the detected red light to a control unit 110. The optical sensor 36B detects the light intensity of the blue light of the S-polarized light that is guided by the light guiding optical system 3B, and outputs a blue light intensity signal that indicates light intensity of the detected blue light to the control unit 110. The optical sensor 36G detects the intensity of the green light of the S-polarized light that is guided by the light guiding optical system 3G, and outputs a green light intensity signal that indicates light intensity of the detected green light to the control unit 110.

The blue light illumination device 51 includes the blue laser diode array 53 as a laser light source. For example, in the blue laser diode array 53, twelve blue laser diodes 59 are arranged in an array shape of 4×3.

In addition, the blue light illumination device 51 includes collimated lenses 54, a condenser lens 55, a diffusion plate 56, a pickup lens 57, a collimating lens 58, a first lens array 9, a second lens array 10, a light polarization conversion element 11, and a superimposing lens 12.

The blue light LB that is emitted from the blue laser diode 59 is collimated by the collimated lenses 54, and thereafter condensed by the condenser lens 55, applied onto the diffusion plate 56, and thereby a point light source is formed. Diffused blue light from each point light source on the diffusion plate 56 passes through the pickup lens 57, and is collimated by the collimating lens 58, and thereafter, incident on the first lens array 9.

The first lens array 9 divides an illuminating light beam that is emitted from the collimating lens 58 into a plurality of partial light beams. The partial light beams are incident on the light polarization conversion element 11 via the second lens array 10. The light polarization conversion element 11 emits light in a light polarization direction of each partial light beam that is divided by the first lens array 9 as a linearly polarized light of approximately one type that is aligned to the polarized light direction. For example, the light polarization conversion element 11 permits the light (for example, P-polarized light) polarized in one direction of the illumination light from the blue laser diode 59 to pass through, and reflects the light (for example, S-polarized light) polarized in another direction towards an orthogonal direction to an illumination light axis 51ax. In this case, the light that passes through the light polarization conversion element 11 is substantially P-polarized light, but all the light is not the P-polarized light, and S-polarized light is mixed. The superimposing lens 12 condenses the plurality of partial light beams that pass through the light polarization conversion element 11, and superimposes the condensed light beams around an image forming area of the reflection type liquid crystal panel 4B. In addition, the superimposing lens 12 may be configured by a combination lens in which a plurality of lenses is combined.

The yellow light illumination device 52 includes the excitation laser diode array 60 as a laser light source. For example, in the excitation laser diode array 60, thirty excitation laser diodes 62 are arranged in an array shape of 6×5. The excitation laser diode 62 emits ultraviolet light or blue light, as excitation light for exciting fluorescent materials.

In addition, the yellow light illumination device 52 includes collimated lenses 54, a condenser lens 55, a fluorescent material substrate 61, a pickup lens 57, a collimating lens 58, a first lens array 9, a second lens array 10, a light polarization conversion element 11, and a superimposing lens 12.

The collimated lenses 54 are provided so as to correspond to each excitation laser diode 62.

The first lens array 9, the second lens array 10, the light polarization conversion element 11, and the superimposing lens 12 in the yellow light illumination device 52 have the same configuration as the first lens array 9, the second lens array 10, the light polarization conversion element 11, and the superimposing lens 12 in the blue light illumination device 51, respectively. However, the yellow light illumination device 52 is different from the blue light illumination device 51 in that the illumination light axis 51ax of the blue light illumination device 51 is changed to an illumination light axis 52ax.

The fluorescent material substrate 61 has a configuration in which a fluorescent material layer that receives the excitation light of the ultraviolet light or the blue light or the like and emits the yellow light is formed on the substrate. The excitation light that is emitted from the excitation laser diode 62 is collimated by the collimated lenses 54, condensed by the condenser lens 55, and applied to the fluorescent material substrate 61. As a result, the point light source is formed. The yellow light LY that is emitted from the point light source on the fluorescent material substrate 61 passes through the pickup lens 57, is collimated by the collimating lens 58, and thereafter is incident on the first lens array 9.

The blue light LB that is condensed by the superimposing lens 12 is converted into a substantially parallel light beam by the condenser lens 32B of the light guiding optical system 3B, and is incident on the light polarization beam splitter 28 via the first iris 37. The light polarization beam splitter 28 according to the present embodiment permits the P-polarized light to pass through, and reflects the S-polarized light, as an example. The illumination light beam of the blue light illumination device 51 is aligned with the linearly polarized light (for example, P-polarized light) of approximately one type by the light polarization conversion element 11. For this reason, the light that passes through the condenser lens 32B passes through the light polarization beam splitter 28, and is incident on the blue light reflection type liquid crystal panel 4B. In addition, the other condenser lenses 32R and 32G are also configured in the same manner as the condenser lens 32B.

The light beam of blue light of S-polarized light that is reflected by the light polarization beam splitter 28 is narrowed by a second iris 38, and is guided to the optical sensor 36B. In addition, the light polarization beam splitter 28 reflects the blue light of the S-polarized light, in the blue light that is reflected by the reflection type liquid crystal panel 4B, and permits the blue light of the P-polarized light to pass through. As a result, the blue light of the S-polarized light that is reflected by the light polarization beam splitter 28 is guided to a light polarization plate 34B. The light polarization plate 34B permits only the light polarized in a predetermined direction to pass through, in the guided blue light. As a result, the blue light polarized in the predetermined direction is guided to the cross dichroic prism 5.

In addition, the other light polarization beam splitters 26 and 27 are also configured in the same manner as the above-described light polarization beam splitter 28.

The condenser lens 32R of the light guiding optical system 3R converts each partial light beam of the red light LR that passes through the dichroic mirror 25 into a substantially parallel light beam with respect to each main light ray. The first iris 37 narrows the substantially parallel light beam that is converted by the condenser lens 32R. As a result, the red light LR that passes through the dichroic mirror 25 is incident on the light polarization beam splitter 26 via the condenser lens 32R and the first iris 37. The light polarization beam splitter 26 has a function that permits the P-polarized light to pass through and reflects the S-polarized light, as an example. The illumination light beam from the yellow light illumination device 52 is aligned to the linearly polarized light (for example, P-polarized light) of an approximately one type that is substantially aligned to the polarized light direction by the light polarization conversion element 11. For this reason, the light that passes through the condenser lens 32R passes through the light polarization beam splitter 26 and is incident on the red light reflection type liquid crystal panel 4R. In addition, the light beam of the blue light of the S-polarized light that is reflected by the light polarization beam splitter 26 is narrowed by the second iris 38, and is guided to the optical sensor 36R.

The light polarization beam splitter 26 reflects the red light of the S-polarized light and permits the red light of the P-polarized light to pass through, in the red light that is reflected by the reflection type liquid crystal panel 4R. As a result, the red light of the P-polarized light that is reflected by the light polarization beam splitter 26 is guided to the light polarization plate 34R. The light polarization plate 34R permits only the light that is polarized in a predetermined direction to pass through, in the guided red light. As a result, the red light that is polarized in the predetermined direction is guided to the cross dichroic prism 5.

The light guiding optical system 3G includes the condenser lens 32G, the first iris 37, the light polarization beam splitter 27, the second iris 38, and a light polarization plate 34G.

The condenser lens 32G converts each partial light beam of the green light LG that is reflected by the dichroic mirror 25 into a substantially parallel light beam with respect to each main light ray. The first iris 37 narrows the substantially parallel light beam that is converted by the condenser lens 32G. As a result, the green light LG that is reflected by the dichroic mirror 25 is incident on the light polarization beam splitter 27 via the condenser lens 32G and the first iris 37. The light polarization beam splitter 27 has a function that permits the P-polarized light to pass through and reflects the S-polarized light, as an example. The illumination light beam from the yellow light illumination device 52 is aligned to the linearly polarized light (for example, P-polarized light) of an approximately one type that is substantially aligned to the polarized light direction by the light polarization conversion element 11. For this reason, the light that passes through the condenser lens 32G passes through the light polarization beam splitter 27 and is incident on the green light reflection type liquid crystal panel 4G. The light beam of the green light of the S-polarized light that is reflected by the light polarization beam splitter 27 is narrowed by the second iris 38, and is guided to the optical sensor 36G.

In addition, the light polarization beam splitter 27 reflects the green light of the S-polarized light and permits the green light of the P-polarized light to pass through, in the green light that is reflected by the reflection type liquid crystal panel 4G. As a result, the green light of the S-polarized light that is reflected by the light polarization beam splitter 26 is guided to the light polarization plate 34G. The light polarization plate 34G permits only the light that is polarized in a predetermined direction to pass through, in the guided green light. As a result, the green light that is polarized in the predetermined direction is guided to the cross dichroic prism 5.

The cross dichroic prism 5 is an optical element that synthesizes the modulated optical image with light of each color which is emitted from the light polarization plate 34R, the light polarization plate 34G, and the light polarization plate 34B, and forms a color image. The cross dichroic prism 5 forms a substantially rectangular shape, which is configured by bonding four right angle prisms, in a planar view, and a dielectric multilayer film is formed on an interface of a substantially X-shape that is formed by bonding the right angle prisms. The dielectric multilayer film that is formed on one interface of the substantially X-shape reflects the blue light LB, and the dielectric multilayer film that is formed on the other interface reflects the red light LR. The blue light LB and the red light LR are bent by the dielectric multilayer film, aligned to a travelling direction of the green light LG that passes through the cross dichroic prism 5, and thereby the light of three colors is synthesized.

The color image that is formed by the light which is emitted from the cross dichroic prism 5 is enlarged by the projection optical system 6 to be projected, and the image is formed on the screen SC.

A body of the projector 1 includes an image processing system that controls an operation of the projector 1 and electrically processes an image signal. The image processing system includes the control unit 110, the image input I/F 101, a storage unit 102, an input processing unit 103, the light source drive unit 130, an image processing unit 131, a frame memory 132, and the light modulation device drive unit 133.

The image input I/F 101 receives an input of digital image data from an external image supply device, and outputs the input image data to the image processing unit 131, as described above. The image input I/F 101 includes an interface that is compliant with various standards for transmitting the image data. The interface may be an interface of a communication system, and may be an interface of an image and video system. Specifically, the interface is a wired connection interface such as a USE, IEEE1394 or a wired LAN, or a wireless communication interface such as Bluetooth (registered trademark) or a wireless LAN, or the like. In addition, as the image input I/F 101, an interface, such as HDMI (registered trademark), Display Port (registered trademark), CoaXPress (registered trademark), or the like can be used. In addition, the image input I/F 101 may have a plurality of input systems of the image data. The image input I/F 101 selects by switching the input systems according a control of the control unit 110, and outputs the image data of the selected input system. The image data that is input by the image input I/F 101 may be moving image (video) data and may be still image data.

In addition, the image input I/F 101 may have a configuration that can input an analog image signal. In this case, the image input I/F 101 may have an analog image signal A/D (analog/digital) conversion function.

The light source drive unit 130 outputs a pulse signal with respect to blue laser diode array 53 and the excitation laser diode array 60 of the light source unit 3, according to the control of the control unit 110. The light source drive unit 130 adjusts a pulse width of the pulse signal that is output, and a duty ratio between an ON period (High) and an OFF period (Low), thereby PWM-controlling each of the blue laser diode 59 and the excitation laser diode 62.

The image processing unit 131 processes the image data that is input from the image input I/F 101, according to the control of the control unit 110, and outputs the image signal to the light modulation device drive unit 133.

The processing that is performed by the image processing unit 131 is determination processing of a 3D (stereoscopic) image and a 2D (planar) image, resolution conversion processing, frame rate conversion processing, 3D image conversion processing, distortion correction processing, zoom processing, color tone correction processing, luminance correction processing, or the like. It is also possible to perform by combining a plurality of processing items among these. In addition, the image processing unit 131 outputs the determination result of the 3D image and the 2D image, the image data that is input from the image input I/F 101, or the like to the control unit 110. Using this processing, the image processing unit 131 may determine by analyzing the data that is added to the image data which is input from the image input I/F 101. In addition, the image processing unit 131 may analyze the frame of the image data, thereby determining whether or not the data is a 3D image data of a type, such as side-by-side, top-and-bottom, frame-by-frame, or frame packing.

The determination processing of the 3D image and the 2D image is processing of determining whether the image data that is input from the image input I/F 101 is the 3D image or the 2D image.

The resolution conversion processing is processing of converting by matching the resolution of the input image data with the resolution that is designated by the control unit 110, for example, a display resolution of the reflection type liquid crystal panels 4R, 4G, and 4B, by means of the image processing unit 131. The frame rate conversion processing is processing of converting a frame rate of the input image data into a frame rate that is designated by the control unit 110, by means of the image processing unit 131. For example, in a case where an overdrive display is performed by the reflection type liquid crystal panels 4R, 4G, and 4B, the processing of generating an intermediate frame from the input image data, or the like is included. This processing may include the processing of converting or generating a vertical synchronization signal.

The 3D image conversion processing is performed in a case where it is determined that the input image data is 3D image data. Using the 3D image conversion processing, the image processing unit 131 generates a frame that is appropriate for the display resolution of the reflection type liquid crystal panels 4R, 4G, and 4B, together with the input image data of a type, such as side-by-side, top-and-bottom, line-by-line, or frame packing. For example, the image processing unit 131 generates the image data of a frame sequential type in which a frame for the left eye and a frame for the right eye are alternately output by being time-shared. By this processing, the image processing unit 131 may perform processing of generating an intermediate frame as necessary, and when the image signal is output to the light modulation device drive unit 133, may output a 3D identification signal (L/R signal) that indicates whether the image signal being output is a frame for the left eye or a frame for the right eye.

The distortion correction processing is processing that converts the image data according to a correction parameter that is input from the control unit 110, and corrects trapezoidal distortion or pincushion distortion of the projected image on the screen SC. The zoom processing is processing that in a case where zooming is instructed by a remote controller or an operation of an operation panel, the image is enlarged or contracted. The color tone correction processing is processing of changing the color tone of the image data, and the data of the respective pixels that are included in the image data is changed to match the color tone that is designated by the control unit 110. By this processing, the projector 1 can realize the color tone that is appropriate for watching a movie, the color tone that is appropriate for a case where the screen SC is provided in a bright environment, the color tone that is appropriate for a case where an image is projected on a screen SC that is non-white such as a blackboard, or the like. In addition to the color tone correction processing, contrast adjustment or the like may be formed. The luminance correction processing is processing of correcting the luminance of the image data, in correspondence with a light emitting state of the light source unit 3, or the brightness or the like of the environment in which the projector 1 is provided.

The detail and parameter of the above-described processing that is performed by the image processing unit 131, and the timing of start/end of the process is controlled by the control unit 110.

The image processing unit 131 develops the image data that is input from the image input I/F 101 into the frame memory 132, and performs the above-described various processing items with respect to the developed image data. The image processing unit 131 reads post-processing image data from the frame memory 132, and outputs the read data to the light modulation device drive unit 133.

The light modulation device drive unit 133 is connected to the reflection type liquid crystal panels 4R, 4G, and 4B of the light modulation device 4. The light modulation device drive unit 133 drives the reflection type liquid crystal panels 4R, 4G, and 4B, based on the image signal that is input from the image processing unit 131, and draws the images on each liquid crystal panel.

In addition, the light modulation device drive unit 133 includes a luminance expansion processing unit 135. The luminance expansion processing unit 135 expands the image signal that is input from the image processing unit 131 to a luminance expansion rate (gain) that is designated, and performs processing of enlarging a luminance range of the image signal. Since the image processing unit 131 outputs image signals of various colors such as R, G, and B, as will be described later, the luminance expansion processing unit 135 expands the image signals for each color of R, G, and B. Since the light modulation device drive unit 133 drives the reflection type liquid crystal panels 4R, 4G, and 4B, based on the image signals that are processed by the luminance expansion processing unit 135, the image in which the luminance range is expanded is displayed on the reflection type liquid crystal panels 4R, 4G, and 4B.

The control unit 110 is connected to the storage unit 102 and the input processing unit 103.

The storage unit 102 stores in a non-volatile manner a program that is executed by a CPU (not illustrated) which is included in the control unit 110, data that is processed by the control unit 110, or the like. For example, the storage unit 102 stores the set values of various processing items that are performed by the image processing unit 131, a table that is referenced by the control unit 110 or the image processing unit 131, or the like. In addition, the image data is stored in the storage unit 102, and the image data may be read by the control unit 110 and then may be projected on the screen SC. In addition, the storage unit 102 stores an LUT 107.

The input processing unit 103 receives and decodes a wireless signal that is transmitted from a remote controller (not illustrated) which operates the projector 1, and detects an operation of the remote controller. In addition, the input processing unit 103 detects an operation of buttons in the operation panel (not illustrated) that are provided in a body of the projector 1. The input processing unit 103 generates operation data that indicates the operation of the remote controller or the operation panel, and outputs the generated data to the control unit 110. In addition, the input processing unit 103 controls a lighting state of an indicator lamp of the operation panel (not illustrated) according to an operation state or a setting state of the projector 1, according to the control of the control unit 110.

The control unit 110 includes a projection control unit 111, a characteristic amount acquisition unit 112, a luminance expansion rate acquisition unit 113, a light attenuation rate setting unit 114, a light attenuation processing unit 115, and a light source control unit 116, and controls the operation of the projector 1.

The projection control unit 111 controls an operation of projecting the image, based on the operation data that is input from the input processing unit 103.

The projection control unit 111 controls the light source drive unit 130 using the light source control unit 116, along with the start and end of the projection. The light source unit 3 is turned on or off by this control.

In addition, the projection control unit 111 instructs performing of the above-described various processing with respect to the image processing unit 131, based on the image data that is input from the image processing unit 131 or the operation data that is input from the input processing unit 103, and generates parameters required for the processing to output. In addition, the projection control unit 111 controls the image input I/F 101 and instructs switching of the input system.

In addition, the control unit 110 is connected to the optical sensors 36R, 36G, and 36B. The control unit 110 may control the light source drive unit 130 based on the light intensity signal that is input from the optical sensors 36R, 36G, and 36B, thereby adjusting the luminance of the blue laser diode array 53 and the excitation laser diode array 60.

The projector 1 projects an image with good quality, and thus expands the luminance of the image based on the image data that is input to the image input I/F 101. Specifically, based on the image data that is input, the image processing unit 131 expands the luminance of each pixel of the images that are developed to the frame memory 132. By this process, a sense of contrast of the image is improved, but the brightness of all the images are increased by expanding the luminance, and there is a possibility that a difference between the pre-processing image and the post-processing image becomes excessive. For this reason, the projector 1 performs light adjustment processing of attenuating the light intensity that is applied to the reflection type liquid crystal panels 4R, 4G, and 4B by the light source unit 3, in accordance with the luminance expansion processing. As a result, it is possible to maintain the brightness of the image in an appropriate brightness, and to increase a sense of contrast. In addition, since light intensity of the light source unit 3 is adjusted in accordance with the image that is displayed in the light adjustment processing, the light intensity of the light source unit 3 becomes zero, in a case where the image is all black, for example.

Incidentally, if light adjustment is performed, light intensity that is applied to the reflection type liquid crystal panels 4R, 4G, and 4B by the light source unit 3 is decreased, and thereby temperature of the reflection type liquid crystal panels 4R, 4G, and 4B is decreased to a lower temperature than that of a case where the light adjustment is not performed. If the light adjustment is performed in a case where ambient temperature of the reflection type liquid crystal panels 4R, 4G, and 4B is low, it is considered that the temperature of the reflection type liquid crystal panels 4R, 4G, and 4B is decreased to a lower temperature than that of an appropriate temperature range. As the appropriate temperature range, a rated operating temperature range of the reflection type liquid crystal panels 4R, 4G, and 4B can be used, and a temperature range that is established by a manufacturer of the projector 1 or the reflection type liquid crystal panels 4R, 4G, and 4B may be used. In this case, the response speed of the reflection type liquid crystal panels 4R, 4G, and 4B is decreased, and in a case where a moving image (video) is displayed, blur (afterimage) can occur. In addition, in a case where a 3D image is displayed in the frame sequential type, crosstalk can occur due to a decrease of the response speed. Particularly, there is a possibility that occurrence of the crosstalk gives strong discomfort to a user that watches the image.

In order to solve such concern, the projector 1 controls light intensity of the light source unit 3 in such a manner that the temperature of the reflection type liquid crystal panels 4R, 4G, and 4B is not excessively lowered in a case where the light adjustment is performed, and particularly, controls in such a manner that the light intensity of the light source unit 3 does not become zero in a case where the 3D image is displayed.

This operation will be described with reference to FIGS. 3 to 5.

Figure 3:
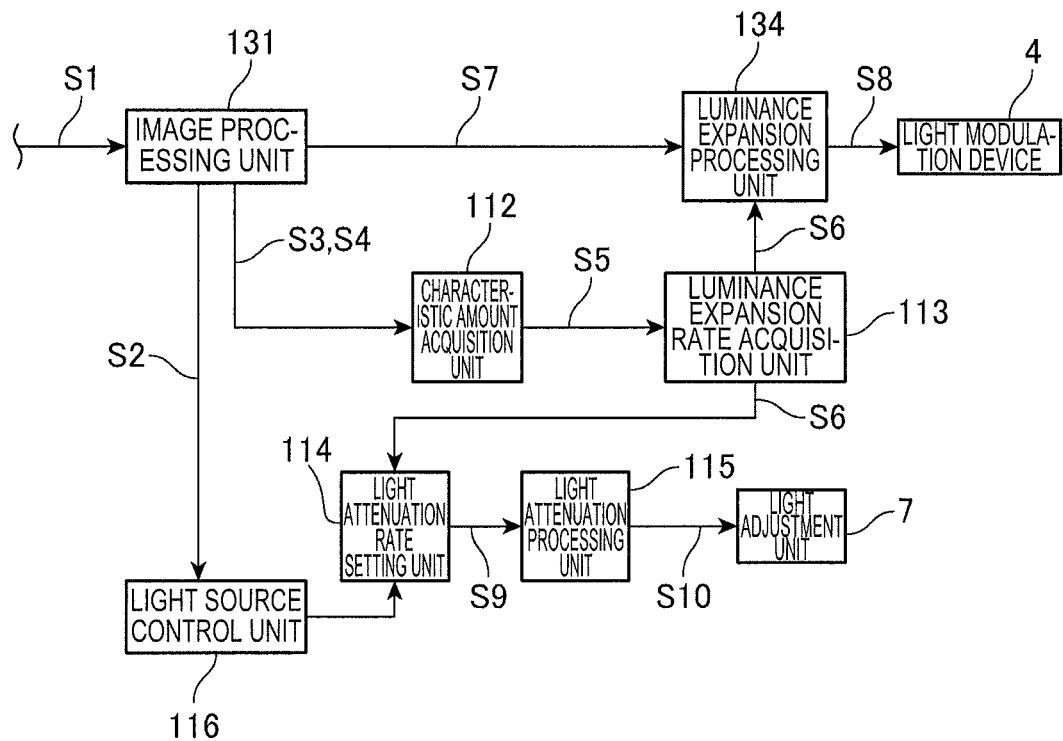
FIG. 3 is a diagram schematically illustrating a function of a projector.

FIG. 3 is a diagram schematically illustrating a function of the projector 1 according to the first embodiment.

As illustrated in FIG. 3, input image data S1 that is input from the image input I/F 101 is input to the image processing unit 131. The image processing unit 131 develops the image of one frame into the frame memory 132 (FIG. 1), based on the image data S1, and outputs an image signal S7 for displaying the image to the luminance expansion processing unit 135.

In addition, the image processing unit 131 analyzes a format of the image data S1, determines whether the image data S1 is 2D image data or 3D image data, and outputs 2D/3D information S2 that indicates the determination result to the light source control unit 116. The light source control unit 116 outputs the 2D/3D information S2 to the light attenuation rate setting unit 114, and controls an operation of the light attenuation rate setting unit 114.

In a case where the image data S1 is the 3D image data, the image processing unit 131 determines whether the input image data S1 (frame in a case of moving image) is an image for the left eye or an image for the right eye. The image processing unit 131 outputs an L/R signal S3 indicating whether the image signal S7 is an image for the left eye (L) or an image for the right eye (R) to the characteristic amount acquisition unit 112. In addition, the image processing unit 131 outputs luminance information S4 that is data with regard to the luminance of the frame of a processing target of the image data S1 to the characteristic amount acquisition unit 112.

The image processing unit 131 outputs the above-described 2D/3D information S2, the L/R signal S3, and the luminance information S4, in synchronization with the image signal S7.

Based on the luminance information S4 that is input from the image processing unit 131, the characteristic amount acquisition unit 112 acquires the amount of characteristic of the image signal S7, and outputs the acquired amount of characteristic S5 to the luminance expansion processing unit 135. The luminance information S4 that is output from the image processing unit 131 includes luminance data of the entire image (entire frame), but the characteristic amount acquisition unit 112 may acquire the amount of characteristic using the luminance data of a portion of the image. In addition, by weighting the luminance data for each portion of the image, the amount of characteristic may be acquired. In this case, even if a black band area is produced in a peripheral portion of the image due to a difference of resolution or aspect ratio between the image data S1 and the reflection type liquid crystal panels 4R, 4G, and 4B, it is possible to acquire an appropriate amount of characteristic for the image except for the black band, by excluding an affection of the luminance of the area.

As the amount of characteristic that is acquired by the characteristic amount acquisition unit 112, for example, a peak value of luminance, an average picture level (APL), a luminance histogram can be used, but another amount of characteristic may be acquired. As a method in which the characteristic amount acquisition unit 112 acquires the amount of characteristic, a known method can be used.

In a case where the image data S1 is the 3D image data, the characteristic amount acquisition unit 112 determines whether the luminance information S4 is an image for the left eye or an image for the right eye, based on the L/R signal S3, and the amount of characteristic may be acquired using one piece of information (for example, the luminance information S4 of the image for the left eye). That is, the amount of characteristic with respect to the other piece of information (for example, the luminance information S4 of the image for the right eye) is not acquired. In this case, it is possible to prevent the amount of characteristic from changing by an affection of parallax between the image for the left eye and the image for the right eye, and there is an advantage that a processing load can be reduced by decreasing an amount of calculation.

The luminance expansion rate acquisition unit 113 acquires a luminance expansion rate, based on the amount of characteristic S5 that is input from the characteristic amount acquisition unit 112, and outputs the acquired luminance expansion rate S6 to the luminance expansion processing unit 135. The luminance expansion rate acquisition unit 113 acquires the luminance expansion rate corresponding to the amount of characteristic S5 in the LUT 107, for example.

Figure 4:
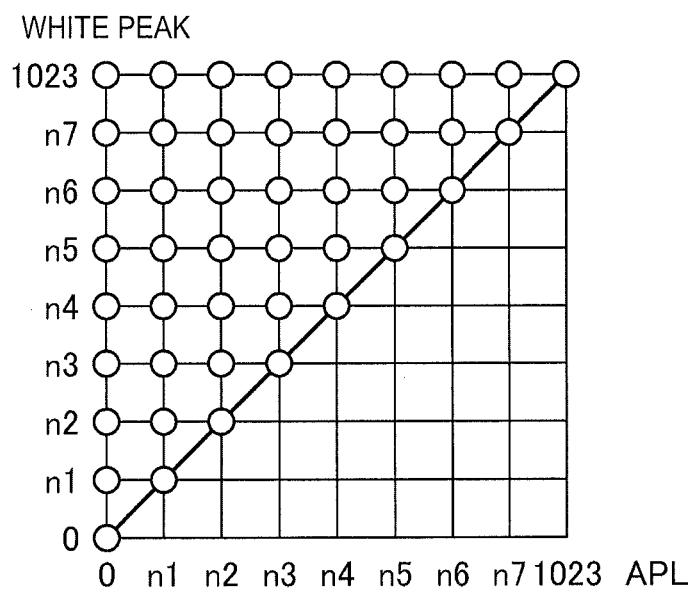
FIG. 4 is a diagram illustrating a configuration example of LUT included in the projector.

FIG. 4 is a diagram illustrating an example of the LUT 107.

The LUT 107 of FIG. 4 is a table in which the luminance expansion rate is set in correspondence with the APL and the luminance peak value. In the LUT 107, plots that are illustrated by O in FIG. 4 are specified by the APL and the luminance peak value, and the luminance expansion rate is set to each plot. The luminance expansion rate acquisition unit 113 specifies plots corresponding to the APL and the luminance peak that are input as the amount of characteristic S5, and the luminance expansion rate that is set in the specified plot is acquired. In addition, in a case where there is no plot corresponding to the APL and the luminance peak that are input as the amount of characteristic S5, a luminance expansion rate that is set to a close plot may be acquired. Alternatively, the luminance expansion rate may be acquired by performing an interpolation calculation based on the luminance expansion rate that is set to the plots of a plurality of three points or four points.

The storage unit 102 may store a plurality of LUTs 107. In this case, each LUT 107 has a value with a luminance expansion rate different from each other that is set in correspondence with the plot. The luminance expansion rate acquisition unit 113 refers to switching the plurality of LUTs 107 that is stored in the storage unit 102.

In addition, the luminance expansion rate acquisition unit 113 may calculate the luminance expansion rate using a calculation formula or a parameter that is set in advance based on the amount of characteristic S5.

The luminance expansion processing unit 135 performs processing of expanding the luminance of the image signal S7, according to the luminance expansion rate S6 that is input from the luminance expansion rate acquisition unit 113. This processing is processing of increasing the sense of contrast by widely expanding the luminance range of the image, and the luminance expansion rate S6 is a parameter that is used for the luminance expansion processing. For example, if the luminance expansion rate is kg, the luminance expansion processing of the following formula (1) is performed. In addition, in the following formula (1), image values of the pre-processing image are represented by (R, G, B), and image values of the post-processing image are represented by (R', G', B').

$$R'=kgR$$
$$G'=kgG$$
$$B'=kgB \quad (1)$$

The light modulation device drive unit 133 drives the reflection type liquid crystal panels 4R, 4G, and 4B based on an image signal S8 in which the luminance is expanded by the luminance expansion processing unit 135.

The luminance expansion rate acquisition unit 113 outputs the luminance expansion rate S6 to the light attenuation rate setting unit 114.

The light attenuation rate setting unit 114 acquires and sets a light attenuation rate based on the 2D/3D information S2 that is input from the light source control unit 116, and the luminance expansion rate S6 that is input from the luminance expansion rate acquisition unit 113. A light attenuation rate S9 that is set by the luminance expansion rate acquisition unit 113 is output to the light attenuation processing unit 115.

The light attenuation rate S9 is a parameter that designates an operation of light-adjusting of the light intensity which is emitted from the light source unit 3 to the reflection type liquid crystal panels 4R, 4G, and 4B by the light attenuation processing unit 115 and the light adjustment unit 7. For example, the light attenuation rate S9 is a value that designates a rate of light intensity after the light is adjusted, in a state where the light intensity is set to 100% in a case where the light adjustment is not performed.

The light attenuation rate setting unit 114 performs a calculation based on the luminance expansion rate S6 using a calculation method that is set in advance, and calculates the light attenuation rate S9. For example, the light attenuation rate setting unit 114 performs a calculation based on the following formula (2).

$$ka=kg-\gamma \quad (2)$$

In the above-described formula (2), ka is a light attenuation rate, kg is a luminance expansion rate, and γ indicates a gamma value of an optical system of the projector 1. Here, the optical system may include an optical element and an optical component that are included in the blue light illumination device 51 and the yellow light illumination device 52 that are illustrated in FIG. 2, may include the light guiding optical systems 3R, 3G, and 3B, and may include the cross dichroic prism 5 and the projection optical system 6. In addition, the optical system in a broad sense may include the reflection type liquid crystal panels 4R, 4G, and 4B. A γ value is stored in advance in the storage unit 102, for example.

As described above, by calculating the light attenuation rate S9 from the luminance expansion rate S6, the light attenuation rate S9 can be corresponded to the luminance expansion rate S6, and the light intensity that is reduced by performing the light adjustment using the light attenuation rate S9 can be compensated by expanding the luminance using the luminance expansion rate S6.

The light attenuation rate setting unit 114 controls the light attenuation processing unit 115 using the light attenuation rate ka that is calculated by the above-described formula (2), and performs light adjustment control. The light attenuation processing unit 115 outputs a control signal S10 that controls the light adjustment unit 7, and the light adjustment is performed by the light adjustment unit 7. The light adjustment unit 7 is not particularly limited to a unit, if the unit can adjust or attenuate the light intensity that is applied to the reflection type liquid crystal panels 4R, 4G, and 4B. For example, the light adjustment unit 7 can be configured with a light shielding plate that is installed on a light path from the light source unit 3 to the light modulation device 4, and a drive unit that controls a position or an angle by driving the light shielding plate. In addition, the light adjustment unit 7 can also be configured with a filter that is installed on a light path from the light source unit 3 to the light modulation device 4, and a control unit that controls light transmittance of a filter. In the present embodiment, the light source drive unit 130 configures the light adjustment unit 7. In this case, the light attenuation processing unit 115 outputs a parameter that is PWM-controlled with respect to the light source drive unit 130 as the control signal S10. The light source drive unit 130 makes the light source unit 3 emit the light, based on the parameter that is input from the light attenuation processing unit 115.

In addition, as described above, the light attenuation rate setting unit 114 limits a range of the light attenuation rate, in such a manner that the response speed of the light modulation device 4 is decreased due to a decrease of the light attenuation rate. For example, in a case where the light attenuation rate ka that is calculated by formula (2) is a lower (smaller) value than a lower limit value that is set in advance, the light attenuation rate setting unit 114 changes the calculated light attenuation rate ka to a default value.

In a case where the image data S1 is 3D image data, it is concerned that the light attenuation rate is low, that is, the light intensity which is applied to the reflection type liquid crystal panels 4R, 4G, and 4B is small. Therefore, in a case where light adjustment is performed when the 3D image is displayed, the light attenuation rate setting unit 114 performs the processing of limiting a range of light attenuation rate ka, based on the 2D/3D information S2. As a result, in a case where the projector 1 displays the 3D image, intensity of incident light of the reflection type liquid crystal panels 4R, 4G, and 4B is maintained to an amount equal to or more than a predetermined value, and thus the temperature of the reflection type liquid crystal panels 4R, 4G, and 4B is maintained to an appropriate temperature range.

Figure 5:
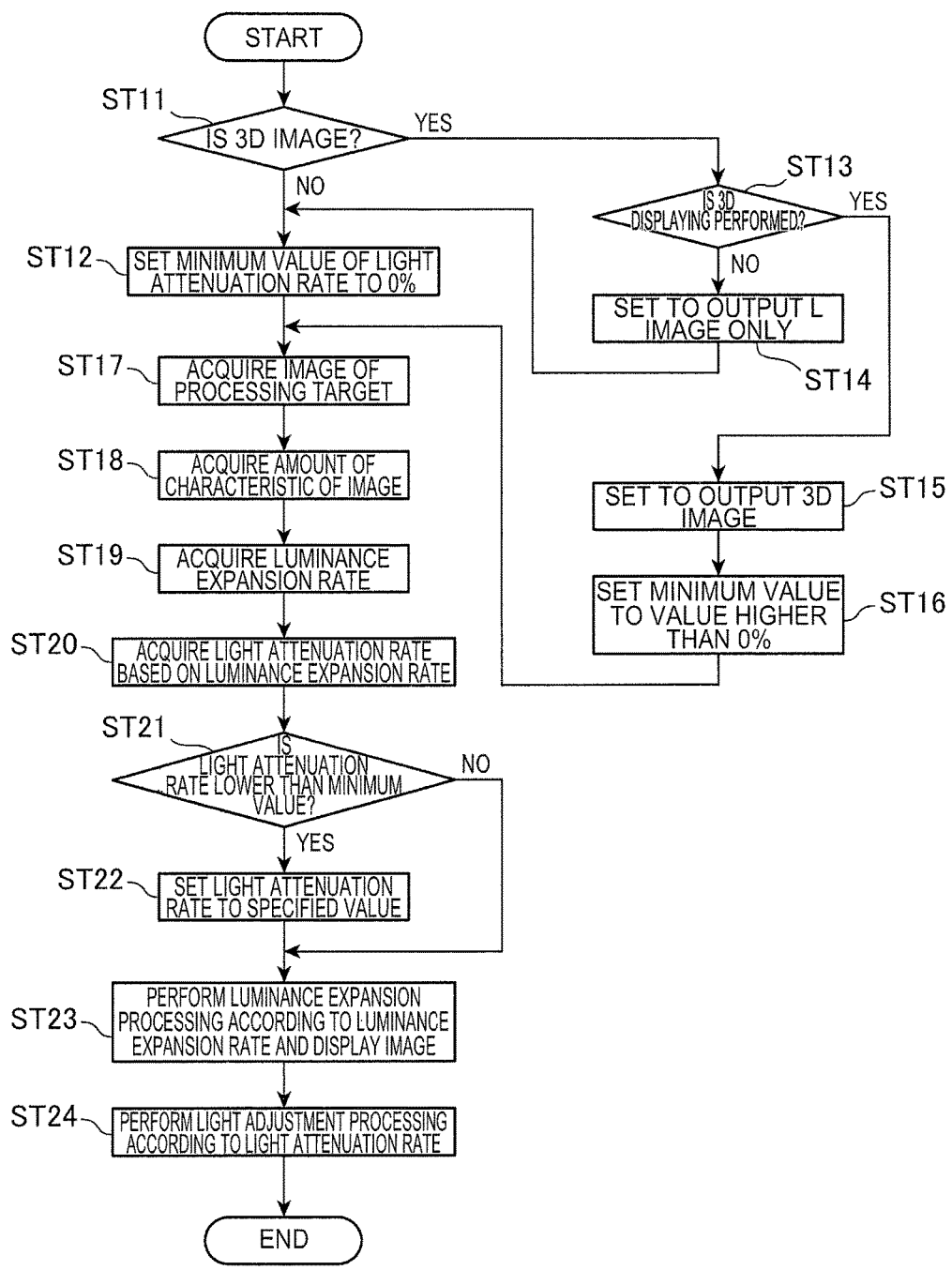
FIG. 5 is a flowchart illustrating an operation of a projector.

FIG. 5 is a flowchart illustrating an operation of the projector 1.

The control unit 110 determines whether the image data that is input to the image input I/F 101 is 3D image data or 2D image data (step ST11). In a case of 2D image data (step ST11; No), the control unit 110 sets a lower limit value of the light attenuation rate to 0% with respect to the light attenuation rate setting unit 114 (step ST12). In this case, it is possible to set the light attenuation rate to an arbitrary value including 0%.

In a case where the image data is 3D image data (step ST11; Yes), the control unit 110 checks the setting in which the projector 1 displays the 3D image (step ST13). The projector 1 can select the 3D displaying and the 2D displaying to set, as a displaying method in a case of inputting the 3D image data. In a case where the 3D displaying is set, the projector 1 alternately displays the image for the left eye and the image for the right eye (by the frame sequential method). In a case where the 2D displaying is set, only the image for the left eye (alternatively, only the image for the right eye) is extracted to be displayed. This setting is performed in advance by an operation of the remote controller or the like, and the set value is stored in the storage unit 102. The control unit 110 performs determination by referring to the set value of the storage unit 102, and in a case where the set value is set to the 2D displaying (step ST13; No), the control unit 110 controls the image processing unit 131, thereby setting to output an image signal of only the image for the left eye (alternatively, only the image for the right eye) (step ST14). Subsequently, the control unit 110 proceeds to step ST12, and sets the minimum value of the light attenuation rate to 0%, in the same manner as in a case where the 2D image data is input.

In a case where the 3D displaying is set (step ST13; Yes), the control unit 110 sets in such a manner that both image signals of the image for the right eye and the image for the left eye is output with respect to the image processing unit 131 (step ST15). The control unit 110 sets the minimum value of the light attenuation rate to a default value with respect to the light attenuation rate setting unit 114 (step ST16). It is preferable that the default value set in step ST16 be a larger value than at least 0%, for example, a value corresponding to a minimum of the light intensity that can maintain an appropriate operation temperature of the reflection type liquid crystal panels 4R, 4G, and 4B, or a value larger than that.

After the minimum value is set in step ST12 or step ST16, the characteristic amount acquisition unit 112 acquires the L/R signal S3 and the luminance information S4 with regard to the image corresponding to one frame of the image data, according to the control of the control unit 110 (step ST17). The characteristic amount acquisition unit 112 acquires the above-described amount of image characteristic, based on the acquired luminance information S4, and outputs the acquired amount of characteristic to the luminance expansion rate acquisition unit 113 (step ST18).

Subsequently, luminance expansion rate acquisition unit 113 acquires the luminance expansion rate based on the amount of characteristic that is acquired by the characteristic amount acquisition unit 112, and outputs the acquired luminance expansion rate to the luminance expansion processing unit 135 and the light attenuation rate setting unit 114 (step ST19).

For example, the light attenuation rate setting unit 114 acquires the light attenuation rate according to the above-described calculation processing, based on the luminance expansion rate that is acquired by the luminance expansion rate acquisition unit 113 (step ST20). Here, the light attenuation rate setting unit 114 determines whether or not the acquired light attenuation rate is lower than the minimum value that is set in step ST12 or step ST16 (step ST21). In a case where the light attenuation rate is lower than the minimum value (step ST21; Yes), the light attenuation rate setting unit 114 sets the light attenuation rate to a specified value that is set in advance, outputs the set light attenuation rate to the light attenuation processing unit 115 (step ST22), and then proceeds to step ST23. In steps ST21 to ST22, the light attenuation rate is clipped by the minimum value, and thereby the light attenuation rate can be maintained to a value equal to or higher than the specified value. The specified value that is set here is, for example, a value corresponding to the minimum value that is set in step ST16, and may be the same value as the minimum value.

In addition, in a case where the light attenuation rate is equal to or higher than the minimum value (step ST21; No), the light attenuation rate that is acquired in step ST20 is output to the light attenuation processing unit 115, and then the processing proceeds to step ST23.

In step ST23, according to the luminance expansion rate that is acquired by the luminance expansion rate acquisition unit 113, the luminance expansion processing unit 135 performs the luminance expansion processing. In addition, the light attenuation processing unit 115 performs the light adjustment processing according to the light attenuation rate (step ST24). Processing items of the steps ST23 and ST24 are not limited to the sequence illustrated in FIG. 5, and may be simultaneously performed.

In the processing of FIG. 5, as the minimum value of the light attenuation rate that is set by the light attenuation rate setting unit 114, at least a first minimum value and a second minimum value are set. In a case where the input image data is stereoscopic (3D) image data, the minimum value of the light attenuation rate becomes the first minimum value, and in a case where the input image data is not the stereoscopic image data, the minimum value of the light attenuation rate becomes the second minimum value. In other words, the first minimum value is a minimum value in a case where the input image data is the stereoscopic (3D) image data, and the second minimum value is a minimum value in a case where the input image data is not the stereoscopic image data. In addition, even if the input image data is the stereoscopic image data, in a case where a planar (2D) displaying is set, the second minimum value is used. In this way, by setting the minimum value, the projector 1 secures intensity of incident light of the reflection type liquid crystal panels 4R, 4G, and 4B.

As described above, the projector 1 according to the first embodiment to which the invention is applied includes the light source unit 3, and the light modulation device 4 that modulates the light which is emitted from the light source unit 3. In addition, the projector 1 includes the light attenuation rate setting unit 114 that sets the light attenuation rate based on the image data, and the light adjustment unit 7 that adjusts an intensity of the incident light of the light modulation device 4 according to the light attenuation rate which is set by the light attenuation rate setting unit 114. The light attenuation rate setting unit 114 sets a minimum of an adjustment range of the light adjustment unit 7 in a case where the image data is 3D image data to a higher value than a minimum of an adjustment range of the light adjustment unit 7 in a case where the image data is not the 3D image data. For this reason, in a case where an image based on the 3D image data is displayed, an intensity of the incident light of the light modulation device 4, that is, an intensity of the incident light of the reflection type liquid crystal panels 4R, 4G, and 4B is secured. As a result, the reflection type liquid crystal panels 4R, 4G, and 4B are warmed by the irradiation with light. Thus, it is possible to maintain the temperature of the reflection type liquid crystal panels 4R, 4G, and 4B in an appropriate temperature, and to maintain the response speed of the reflection type liquid crystal panels 4R, 4G, and 4B in an appropriate state. In addition, this also applies to a case where the light modulation device 4 modulates the light using means other than the reflection type liquid crystal panels 4R, 4G, and 4B.

In addition, the light source unit 3 includes the blue laser diode array 53 that is a solid light source, and the excitation laser diode array 60. In this way, it is possible to maintain the operation temperature of the light modulation device 4 (reflection type liquid crystal panels 4R, 4G, and 4B) within an appropriate temperature range, and to maintain a good response speed, in a configuration in which the solid light source unit 3 with a small amount of heat generation is used. In addition, the light adjustment unit 7 adjusts the light intensity that is emitted from the light source according to the light attenuation rate which is set by the light attenuation rate setting unit 114, and thus, it is possible to maintain a good response speed of the light modulation device 4.

In addition, in a case where the image data is 3D image data, the light attenuation rate setting unit 114 sets the light attenuation rate in which an intensity of the incident light of the reflection type liquid crystal panels 4R, 4G, and 4B is not zero, and thus, it is possible to appropriately adjust an intensity of the incident light of the reflection type liquid crystal panels 4R, 4G, and 4B.

In addition, the projector 1 includes the characteristic amount acquisition unit 112 that acquires the amount of characteristic of the image data, and the light attenuation rate setting unit 114 sets the light attenuation rate of the light adjustment unit 7 based on the amount of characteristic that is acquired by the characteristic amount acquisition unit 112. More specifically, an expansion coefficient of the luminance of an image is acquired by the luminance expansion rate acquisition unit 113 based on the amount of characteristic that is acquired by the characteristic amount acquisition unit 112, and based on the expansion coefficient, the luminance expansion processing unit 135 expands the luminance of the image that is displayed on the reflection type liquid crystal panels 4R, 4G, and 4B. The light attenuation rate setting unit 114 sets the light attenuation rate of the light adjustment unit 7 based on the expansion coefficient that is acquired by the luminance expansion rate acquisition unit 113. For this reason, based on the amount of characteristic of the image data, the processing of expanding the luminance of the image, and the processing of adjusting an intensity of the incident light are performed, and thereby it is possible to increase the sense of contrast. Furthermore, it is possible to maintain the temperature of the reflection type liquid crystal panels 4R, 4G, and 4B in an appropriate temperature.

In addition, in a case where the light attenuation rate of the light adjustment unit 7 that is obtained based on the expansion coefficient is lower than the light attenuation rate that is set in advance, the light attenuation rate setting unit 114 changes the light attenuation rate of the light adjustment unit 7 to a value that is set in advance. As a result, it is possible to maintain the temperature of the reflection type liquid crystal panels 4R, 4G, and 4B in an appropriate temperature using simple processing.

In the first embodiment, the example in which the minimum value that is used for the determination of step ST21 is set to a different value is described, in a case where in the light attenuation rate setting unit 114 of the projector 1, the input image data of the image input I/F 101 is 3D image data and 3D displaying is performed, and in a case other than this case. The invention is not limited to this, and for example, the coefficient γ in formula (2) may be changed to a different value in a case of 3D. In this case, when the input image data is the 3D image data and the 3D displaying is performed, the coefficient is set in such a manner that the light attenuation rate becomes a higher rate than 0%. It is preferable that the coefficient be a coefficient such that, for example, a minimum of the light attenuation rate is equal to or higher than a minimum of the light intensity which can maintain an appropriate operation temperature of the reflection type liquid crystal panels 4R, 4G, and 4B.

Furthermore, the LUT 107 that is used for the characteristic amount acquisition unit 112 to acquire the amount of characteristic in step ST19 may be switched, according to a case where the input image data is 3D image data and 3D displaying is performed, and according to a case other than this. In this case, the amount of characteristic that is acquired by the characteristic amount acquisition unit 112 becomes different values to each other, between a case of performing 3D displaying and a case of 2D displaying, and thus, the light attenuation rates that are obtained from the amount of characteristic becomes different values to each other. Thus, by changing the amount of characteristic that is acquired by the characteristic amount acquisition unit 112, it is possible to acquire and set the light attenuation rate so as to be the light intensity that can maintain an appropriate operation temperature of the reflection type liquid crystal panels 4R, 4G, and 4B. In this case, the light attenuation rate setting unit 114 may not set the minimum value of the light attenuation rate to a different value.

In addition, as described above, a method of obtaining the light attenuation rate using the light attenuation rate setting unit 114 is not limited to the calculation that uses the luminance expansion rate, and the light attenuation rate setting unit 114 may acquire the light attenuation rate based on the amount of characteristic that is acquired by the characteristic amount acquisition unit 112. This example will be described as a second embodiment.

Second Embodiment

Figure 6:
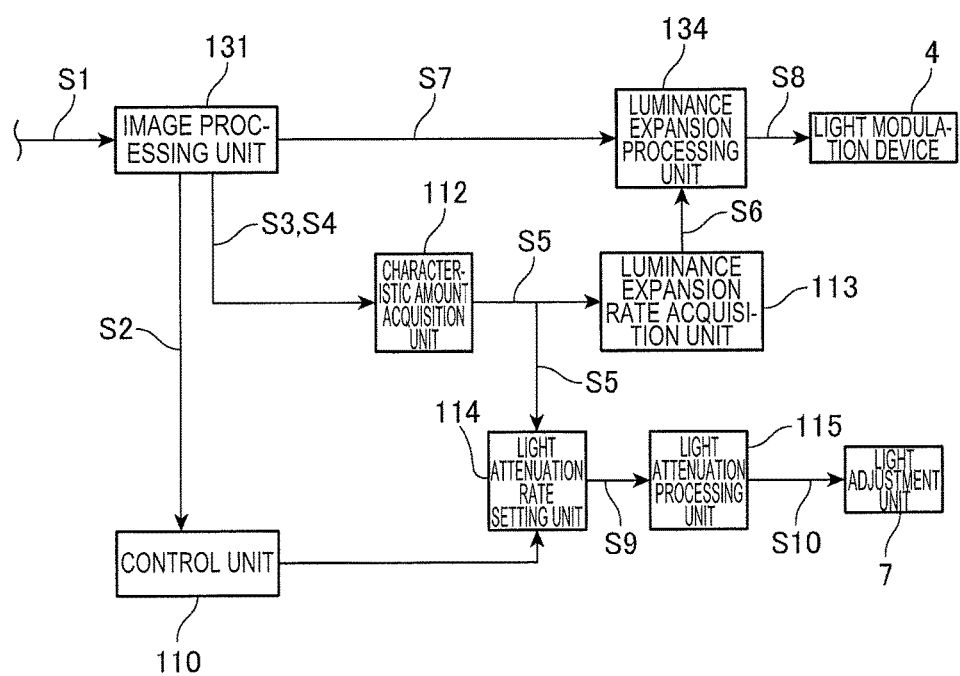
FIG. 6 is a diagram schematically illustrating a function of a projector according to a second embodiment.
Figure 7:
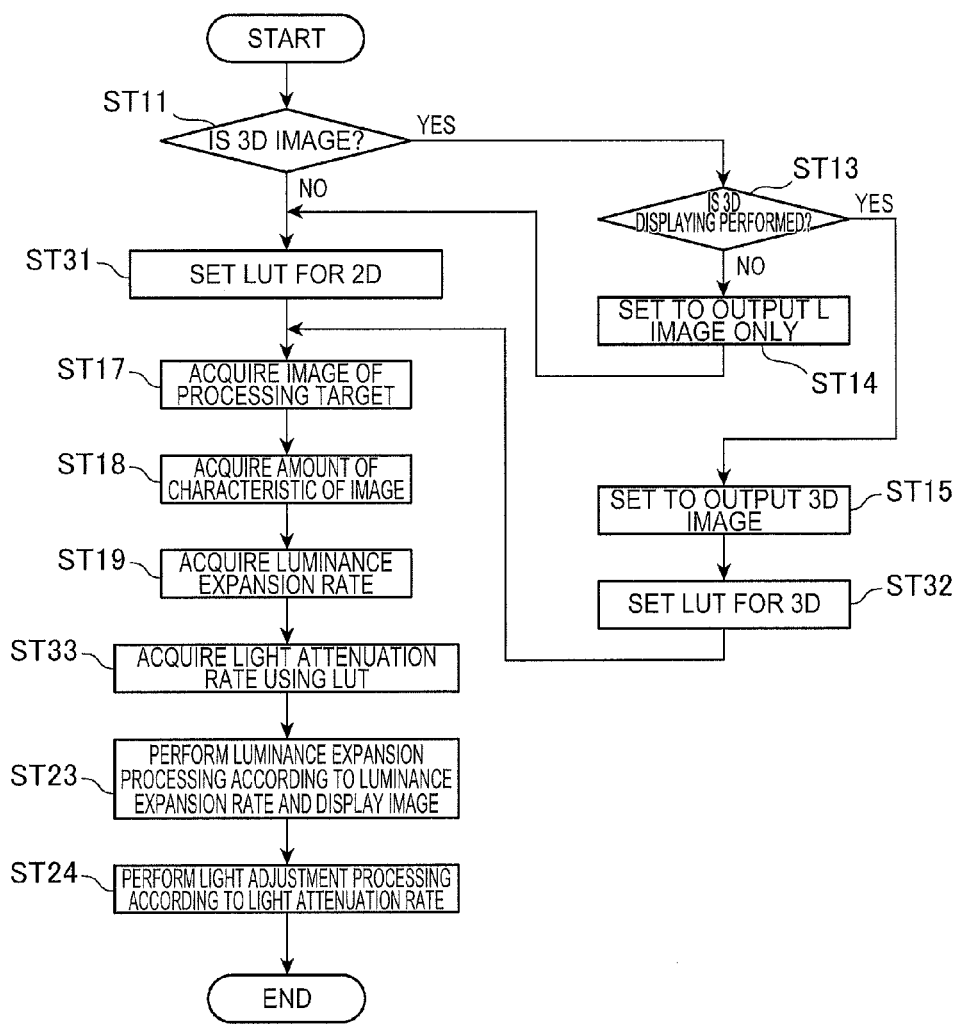
FIG. 7 is a flowchart illustrating an operation of the projector according to the second embodiment.

FIG. 6 is a diagram schematically illustrating a function of the projector 1 according to a second embodiment to which the invention is applied. FIG. 7 is a flowchart illustrating an operation of the projector 1 according to the second embodiment.

In a configuration illustrated in FIG. 6, the amount of characteristic S5 that is acquired by the characteristic amount acquisition unit 112 is input to the light attenuation rate setting unit 114, and based on the amount of characteristic S5, the light attenuation rate setting unit 114 sets the light attenuation rate. Based on the amount of characteristic of the image, the light attenuation rate setting unit 114 can obtain the light attenuation rate using an LUT, in the same manner as in the luminance expansion rate acquisition unit 113 that is described in the first embodiment described above, for example. The LUT has plots that are specified by the amount of characteristic of an image, in the same manner as in the LUT 107 illustrated in FIG. 4, and the light attenuation rate is set for each plot. The light attenuation rate setting unit 114 specifies plots corresponding to the amount of characteristic S5 that is input from the characteristic amount acquisition unit 112, and sets the light attenuation rate that is set in the specified plot.

Then, the control unit 110 can instruct switching of the LUT being used, according to whether the image data S1 is 3D image data or 2D image data, with respect to the light attenuation rate setting unit 114. That is, the light attenuation rate setting unit 114 uses different LUTs depending on whether it is a case of performing 3D displaying or a case of performing 2D displaying. In the LUT for 3D, a light attenuation rate is set which is higher than at least 0%, and which can maintain the operation temperature of the reflection type liquid crystal panels 4R, 4G, and 4B within an appropriate temperature range. For this reason, in a case where the 3D displaying is performed, it is possible to prevent the response speed from decreasing due to a temperature decrease of the reflection type liquid crystal panels 4R, 4G, and 4B, and to prevent crosstalk from occurring. In addition, a wide range of light attenuation rate can be set in the LUT for 2D, and thus, it is possible to increase the sense of contrast more greatly.

That is, the LUT that is used by the light attenuation rate setting unit 114 in a case where the 3D displaying is performed, is an LUT that sets the light attenuation rate equal to or higher than the first minimum value described above, and the LUT that is used by the light attenuation rate setting unit 114 in a case where the 2D displaying is performed, is an LUT that sets the light attenuation rate equal to or higher than the second minimum value described above. As a result, in the same manner as in the first embodiment described above, in a case where input image data is stereoscopic image data, the minimum value of the light attenuation rate becomes the first minimum value. In addition, in a case where the input image data is not the stereoscopic image data, the minimum value of the light attenuation rate becomes the second minimum value, and thereby the light attenuation rate equal to or higher than the minimum value is set.

The operation will be described according to the flowchart of FIG. 7.

The control unit 110 determines whether the image data that is input to the image input I/F 101 is 3D image data or 2D image data (step ST11). In a case where the image data is 2D image data (step ST11; No), the control unit 110 sets in such a manner that the light attenuation rate setting unit 114 uses an LUT for 2D (step ST31).

Meanwhile, in a case where the image data is 3D image data (step ST11; Yes), the control unit 110 checks the setting in which the projector 1 displays a 3D image (step ST13). The control unit 110 refers to the set value of the storage unit 102, controls the image processing unit 131 in a case of being set to 2D displaying (step ST13; No), and performs the setting in which an image signal of only the image for the left eye (alternatively, only the image for the right eye) is output (step ST14). Subsequently, the control unit 110 proceeds to step ST31, and sets the LUT for 2D, in the same manner as in a case where the 2D image data is input.

In a case where 3D displaying is set (step ST13; Yes), the control unit 110 sets in such a manner that the image processing unit 131 outputs both image signals of the image for the right eye and the image for the left eye (step ST15). Subsequently, the control unit 110 sets in such a manner that the light attenuation rate setting unit 114 uses an LUT for 3D (step ST32).

After the LUT is set in step ST31 or step ST32, the characteristic amount acquisition unit 112 acquires the L/R signal S3 and the luminance information S4, according to the control of the control unit 110 (step ST17). Based on the acquired luminance information S4, the characteristic amount acquisition unit 112 acquires the amount of image characteristic described above, and outputs the acquired amount of characteristic to the luminance expansion rate acquisition unit 113 (step ST18).

Subsequently, the luminance expansion rate acquisition unit 113 acquires the luminance expansion rate, based on the amount of characteristic acquired by the characteristic amount acquisition unit 112, and outputs the acquired luminance expansion rate to the luminance expansion processing unit 135 (step ST19). Based on the amount of characteristic acquired by the characteristic amount acquisition unit 112, the light attenuation rate setting unit 114 acquires the light attenuation rate by referring to the set LUT (step ST33).

Subsequently, according to the luminance expansion rate acquired by the luminance expansion rate acquisition unit 113, the luminance expansion processing unit 135 performs the luminance expansion processing (step ST23), and according to the light attenuation rate, the light attenuation processing unit 115 performs the light adjustment processing (step ST24). The processing items of steps ST23 and ST24 is not limited to the sequence illustrated in FIG. 5, and may be performed simultaneously.

As described above, the projector 1 according to the second embodiment includes the LUT that makes the amount of characteristic of the image data correspond to the light attenuation rate of the light adjustment unit 7, and the light attenuation rate setting unit 114 sets the light attenuation rate based on the amount of characteristic acquired by the characteristic amount acquisition unit 112 by referring to the LUT. Then, the LUT that the light attenuation rate setting unit 114 refers to is switched according to a case where the 3D displaying is performed and according to a case where the 3D displaying is not performed. For this reason, it is easy to maintain the temperature of the reflection type liquid crystal panels 4R, 4G, and 4B in an appropriate temperature by switching the LUT. In addition, it is possible to control precisely and rapidly the light attenuation rate using the LUT.

In addition, each embodiment described above is just an example of a specific aspect to which the invention is applied, is not intended to limit the invention, and it is possible to apply the invention as an aspect different from the embodiments. In the above-described embodiments, an example is described in which the light modulation device drive unit 133 performs processing of expanding the luminance of the image signal using the luminance expansion processing unit 135, but a method of expanding the luminance is not limited to this. For example, with respect to the data of the image that the image processing unit 131 develops to the frame memory 132, processing of expanding the luminance may be performed. In addition, for example, with respect to the image signal that is input from the image processing unit 131 to light modulation device drive unit 133, the luminance expansion processing may be performed on a side from which the light is incident to the light modulation device drive unit 133, that is, in front of the light modulation device drive unit 133. Furthermore, as a configuration in which the image processing unit 131 outputs the digital data to the light modulation device drive unit 133, the luminance expansion processing unit 135 may correct the digital data.

In addition, in the above-described embodiments, an example is described in which in a case where the image data that is input to the image input I/F 101 is the 2D image data, and in a case where the 2D displaying is performed, the control unit 110 sets the minimum value of the light attenuation rate to 0% in step ST12. This is merely an example, the minimum value of the light attenuation rate is not limited to 0%, the minimum value may be set to, for example, 10%, and may be set to a different value. In this case, when the input image data is 3D image data and 3D displaying is set, a larger value than the minimum value that is set in step ST12 may be set in step ST16.

In addition, in each embodiment described above, an example is described in which the luminance expansion rate acquisition unit 113 acquires the luminance expansion rate using the LUT 107 illustrated in FIG. 4. In addition, in the second embodiment, an example is described in which the light attenuation rate setting unit 114 acquires the light attenuation rate using the LUT that is the same as the LUT 107. The LUT that is used here is not limited to the example of FIG. 4. That is, the 2D-LUT having plots corresponding to the APL and the peak value is illustrated in FIG. 4, but it is possible to use an LUT in which the luminance expansion rate or the light attenuation rate is set, in correspondence with the APL, the peak value, a luminance histogram, or an amount of another characteristic.

Furthermore, the projector 1 is not limited to a configuration in which an amount of characteristic with regard to all the frames of the input image data is calculated by the characteristic amount acquisition unit 112, and the luminance expansion rate or the light attenuation rate is obtained with regard to all the frames or all the L frames. For example, the characteristic amount acquisition unit 112, the luminance expansion rate acquisition unit 113, and the light attenuation rate setting unit 114 may exclude the intermediate frame that is generated by the control unit 110 or the image processing unit 131 from a processing target. In addition, an average value of an amount of characteristic that the characteristic amount acquisition unit 112 obtains may be obtained with respect to a plurality of frames, and based on the average value, the luminance expansion rate or the light attenuation rate may be obtained, and another specific processing method can be arbitrarily changed.

In addition, an optical configuration of the projector 1 is not limited to the configuration that is illustrated in FIG. 2 and the above-described embodiment. The invention is not limited to a liquid crystal projector that includes the reflection type liquid crystal panels 4R, 4G, and 4B, and can be applied to a projector that uses a transmission type liquid crystal panel or a digital mirror device (DMD). In addition, the projector 1 is configured to generate the light of colors of R, G, and B, based on the light that is emitted from the blue laser diode array 53 and the excitation laser diode array 60 that are two laser light sources, but an LED may be included as a solid light source.

In addition, each function unit of the projector 1 illustrated in FIG. 1 has a functional configuration that is realized by a cooperation of hardware and software, and specific implementation thereof is not particularly limited. In addition, a detailed configuration of each unit of the projector 1 can also be modified arbitrarily within a range without departing from the scope of the invention.

What is claimed is:

1. A projector that projects an image based on image data, comprising:
   a light source;
   a modulation unit that modulates light which is emitted from the light source;
   a light attenuation rate setting unit that sets a light attenuation rate based on the image data; and
   a light adjustment unit that adjusts intensity of incident light of the modulation unit, according to the light attenuation rate which is set by the light attenuation rate setting unit,
   wherein the light attenuation rate setting unit sets a minimum value of an adjustment range of the light adjustment unit in a case where the image data is stereoscopic image data to a higher value than a minimum value of an adjustment range of the light adjustment unit in a case where the image data is not stereoscopic image data, and
   wherein the light attenuation rate setting unit sets the light attenuation rate in such a manner that the light adjustment unit does not adjust the intensity of the incident light to zero in a case where the image data is stereoscopic image data.

2. The projector according to claim 1, wherein the light source includes a solid light source.

3. The projector according to claim 1, wherein the light adjustment unit adjusts light intensity that is emitted from the light source, according to the light attenuation rate that is set by the light attenuation rate setting unit.

4. The projector according to claim 1, further comprising:
   a characteristic amount acquisition unit that acquired an amount of characteristic of the image data,
   wherein the light attenuation rate setting unit sets the light attenuation rate of the light adjustment unit, based on the amount of characteristic that is acquired by the characteristic amount acquisition unit.

5. A projector that projects an image based on image data, comprising:
   a light source;
   a modulation unit that modulates light which is emitted from the light source;
   a light attenuation rate setting unit that sets a light attenuation rate based on the image data;
   a light adjustment unit that adjusts intensity of incident light of the modulation unit, according to the light attenuation rate which is set by the light attenuation rate setting unit
   wherein the light attenuation rate setting unit sets a minimum value of an adjustment range of the light adjustment unit in a case where the image data is stereoscopic image data to a higher value than a minimum value of an adjustment range of the light adjustment unit in a case where the image data is not stereoscopic image data;
   a characteristic amount acquisition unit that acquired an amount of characteristic of the image data,
   wherein the light attenuation rate setting unit sets the light attenuation rate of the light adjustment unit, based on the amount of characteristic that is acquired by the characteristic amount acquisition unit;
   a luminance expansion rate acquisition unit that acquires a expansion coefficient of luminance of an image, based on the amount of characteristic which is acquired by the characteristic amount acquisition unit; and
   a luminance expansion processing unit that expands luminance of an image which is displayed in the modulation unit, based on the expansion coefficient that is acquired by the luminance expansion rate acquisition unit,
   wherein the light attenuation rate setting unit sets the light attenuation rate of the light adjustment unit, based on the expansion coefficient acquired by the luminance expansion rate acquisition unit.

6. The projector according to claim 5, wherein in a case where the light attenuation rate of the light adjustment unit that is obtained based on the expansion coefficient is lower than a light attenuation rate that is set in advance, the light attenuation rate setting unit changes the light attenuation rate of the light adjustment unit to a value that is set in advance.

7. The projector according to claim 4, further comprising:
   a table that makes the amount of characteristic of the image data correspond to the light attenuation rate of the light adjustment unit,
   wherein the light attenuation rate setting unit sets the light attenuation rate based on the amount of characteristic that is acquired by the characteristic amount acquisition unit, by referring to the table, and
   wherein the table being referred to is switched, in a case where the image data is stereoscopic image data and in a case where the image data is not stereoscopic image data.

8. A method of controlling a projector that projects an image based on image data, the method comprising:
setting a light attenuation rate based on the image data;
adjusting intensity of incident light of a modulation unit, according to the light attenuation rate which is set; and
setting a minimum value of an adjustment range of incident light in a case where the image data is stereoscopic image data to a higher value than a minimum value of an adjustment range of the incident light in a case where the image data is not stereoscopic image data,
wherein the light attenuation rate is set in such a manner that the intensity of the incident light is not adjusted to zero in a case where the image data is stereoscopic image data.

* * * * *